United States Patent
Jo

(10) Patent No.: US 7,330,639 B2
(45) Date of Patent: Feb. 12, 2008

(54) METHOD OF PLAYING OPTICAL RECORDING MEDIA

(75) Inventor: Nam-hoon Jo, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1015 days.

(21) Appl. No.: 10/273,097

(22) Filed: Oct. 18, 2002

(65) Prior Publication Data

US 2003/0108330 A1 Jun. 12, 2003

(30) Foreign Application Priority Data

Dec. 7, 2001 (KR) ............................... 2001-77420

(51) Int. Cl.
- *H04N 5/91* (2006.01)
- *H04N 9/00* (2006.01)
- *H04N 5/00* (2006.01)
- *G11B 7/00* (2006.01)
- *G11B 11/00* (2006.01)

(52) U.S. Cl. .................. 386/70; 386/40; 386/126; 369/44.27; 369/53.21

(58) Field of Classification Search .................. 386/45, 386/68, 70, 81, 82, 125, 126; 369/44.27, 369/53.21; 714/770
See application file for complete search history.

(56) References Cited

U.S. PATENT DOCUMENTS

| | | | |
|---|---|---|---|
| 3,405,461 A * | 10/1968 | Joslow | 434/320 |
| 5,615,018 A * | 3/1997 | Wu et al. | 386/68 |
| 6,075,919 A * | 6/2000 | Omoto et al. | 386/68 |
| 6,154,425 A * | 11/2000 | Iida et al. | 369/44.29 |
| 6,351,440 B1 * | 2/2002 | Fukuda et al. | 369/47.36 |
| 6,704,900 B1 * | 3/2004 | Fechser et al. | 714/770 |
| 7,130,253 B2 * | 10/2006 | Hosono | 369/47.38 |

FOREIGN PATENT DOCUMENTS

| | | |
|---|---|---|
| DE | 32 48 278 | 7/1984 |
| EP | 0 676 894 | 10/1995 |
| EP | 0 753 974 | 1/1997 |
| JP | 2001-309281 | 11/2001 |

OTHER PUBLICATIONS

Japanese Office Action dated Apr. 19, 2005 in corresponding Japanese Patent Application No. 2002-350393.

* cited by examiner

*Primary Examiner*—Thai Q. Tran
*Assistant Examiner*—Syed Y. Hasan
(74) *Attorney, Agent, or Firm*—Stass & Halsey LLP

(57) ABSTRACT

An optical recording medium playing apparatus and method thereof to play an optical disc includes a signal processor to process signals read from the optical disc as a reproduced signal. A timer counts a preset time from when the <play> key is entered a first time and transmitting a signal indicative of whether the <play> key is entered a second time within the preset time. A controller executes a backward search of a desired scene when the <play> key is entered the first time, ends the backward search when the <play> key is re-entered or in response to the signal from the timer, and outputs a signal to command normal playing at a point in time when the backward search has ended. A displayer displays the signals read from the optical disc.

15 Claims, 2 Drawing Sheets

METHOD OF PLAYING OPTICAL RECORDING MEDIA

CROSS REFERENCE TO RELATED APPLICATIONS

This application claims the benefit of Korean Application No. 2001-77420 filed Dec. 7, 2001, in the Korean Intellectual Property Office, the disclosure of which is incorporated herein by reference.

BACKGROUND OF THE INVENTION

1. Field of the Invention

The present invention relates to a method of operating an optical recording medium system, and more particularly, to a method of playing an optical recording medium by which a desired scene among scenes being played during a backward search can be easily found.

2. Description of the Related Art

Most digital video disc (DVD) players provide a fast search function. However, in practice, it is unnecessarily complicated to use the fast search function of the DVD player to search for a desired scene because when a <play> button is entered during the fast search (128 speed factor search, i.e., 128×), the desired scene has already passed.

For example, when the <play> button is entered to search for the desired scene at a play time of around 0:10:00 during a 128× search, the scene at around 0:10:00 has already passed. Thus, after the <play> button is entered, a <rewind> button is entered to activate a backward search function to carry out a backward search and to search for the desired scene.

SUMMARY OF THE INVENTION

Various objects and advantages of the invention will be set forth in part in the description that follows and, in part, will be obvious from the description, or may be learned by practice of the invention.

To solve the above-described problems, it is an object of the present invention to provide a method of playing an optical recording medium by which a desired scene among screens being played during a backward search can be easily retrieved.

Accordingly, to achieve the above and other objects, the present invention provides a method of playing an optical recording medium. A play key is entered when a desired scene appears during a fast search. When a backward search is executed at a predetermined speed factor, the play key is entered. The play key is re-entered when the desired scene appears during the backward search to execute normal playing.

After the play key is entered, a timer to end the backward search begins to operate. If the play key is not re-entered, normal playing is executed from a point in time when the backward search has ended after the timer has operated for a predetermined amount of time.

To achieve the above and other objects, the present invention provides a method of an optical recording medium apparatus playing an optical recording medium. A backward search of the optical recording medium is executed when a <play> key is entered during a fast search. The backward search is ended when the <play> key is re-entered or when a preset time expires. Normal playing of the optical recording medium is continued from a point in time when the backward search is ended.

To achieve the above and other objects, the present invention provides a method of playing an optical recording medium, including: entering a key while playing contents of the optical recording medium to execute a backward search function to search for a desired scene. The backward search of the optical recording medium is performed at a predetermined speed factor; and a preset time is counted from when the key is entered. The key is re-entered when the desired scene appears during the backward search. The backward search is ended when the key is re-entered or the preset play time has elapsed. The optical disc is normally played from a point in time when the backward search has ended.

To achieve the above and other objects, the present invention provides an optical recording medium playing apparatus to play an optical disc, including: a signal processor processing signals read from the optical disc as a reproduced signal. A timer counts a preset time from when the <play> key is entered a first time and transmits a signal indicative of whether the <play> key is entered a second time within the preset time. A controller executes a backward search of a desired scene when the <play> key is entered the first time, ends the backward search when the <play> key is re-entered or in response to the signal from the timer, and outputs a signal to command normal playing at a point in time when the backward search has ended. A displayer displays the signals read from the optical disc.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantage of the present invention will become more apparent by describing in detail preferred embodiments thereof with reference to the attached drawings in which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

The present invention will be described in more detail with reference to FIGS. 1 and 2.

Figure 1:
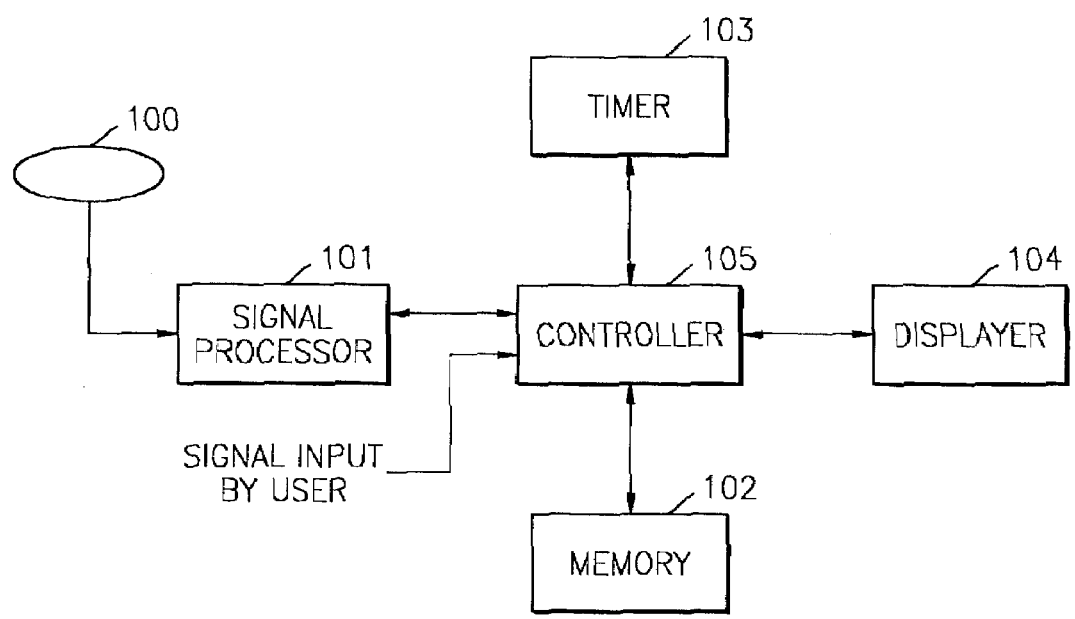
FIG. 1 is a block diagram of a configuration of an optical recording medium playing apparatus, in accordance with an embodiment of the present invention.

FIG. 1 is a block diagram of a configuration of an optical recording medium playing apparatus, which includes an optical disc 100, a signal processor 101, a memory 102, a timer 103, a displayer 104, and a controller 105.

Figure 2:
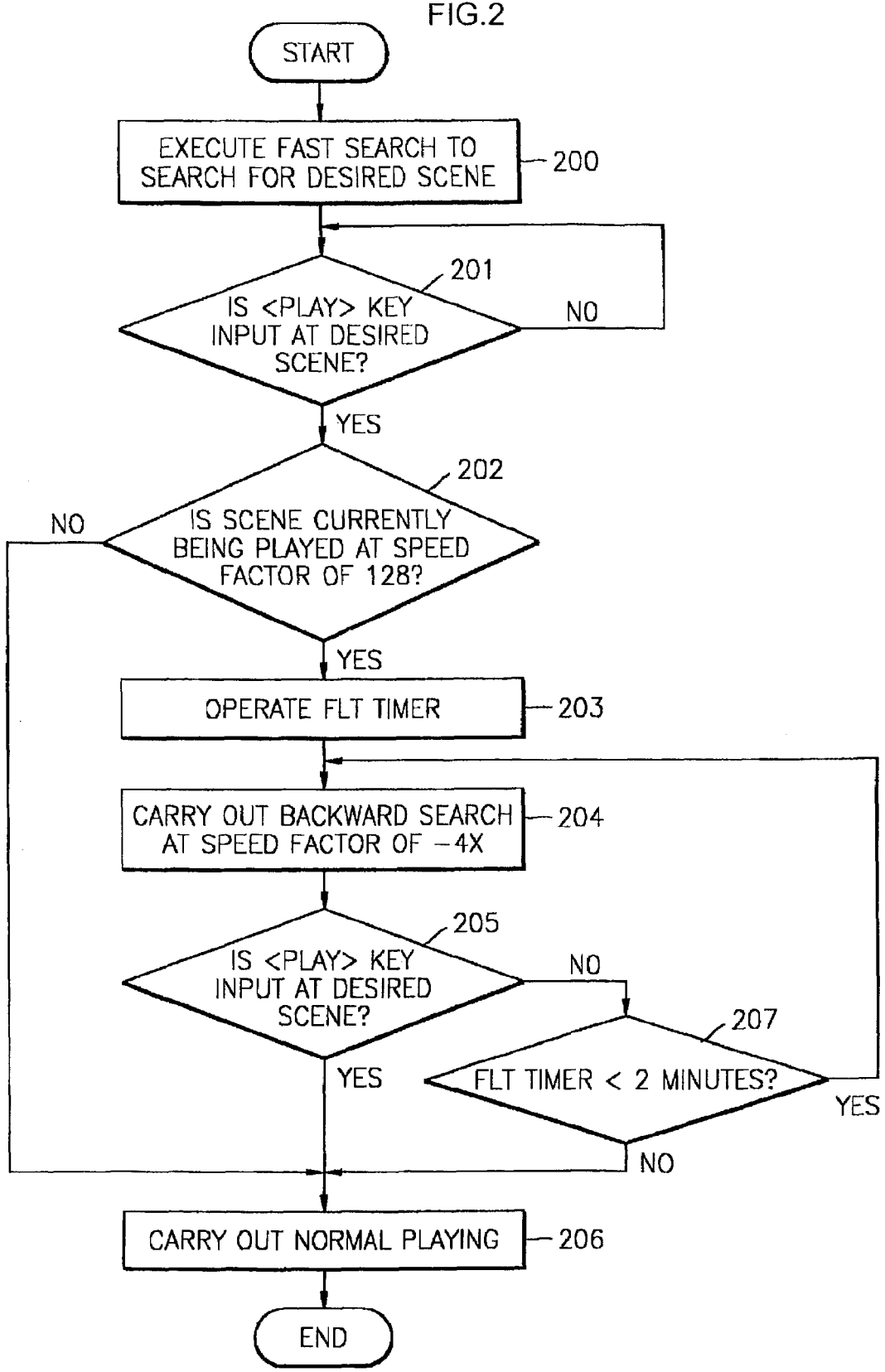
FIG. 2 is a flowchart illustrating a method of playing an optical recording medium according to the present invention.

FIG. 2 is a flowchart illustrating a method of playing an optical recording medium according to the present invention. Referring to FIG. 2, at operation 200, a fast search function is executed to search for a desired scene. At operation 201, the method checks whether a <play> key is entered-at the desired scene. At operation 202, the method checks whether a scene is currently being played at a high speed (for instance, at a speed factor of 128, 128×). At operation 203, a Fluorescence Light Tube (FLT) timer begins to operate. At operation 204, a backward search at a speed factor of, for instance, 4× is carried out. At operation 205, the method checks whether the <play> key is entered at the desired scene. At operation 207, the method checks whether the FLT timer has counted a predetermined time of, for instance, 2 minutes. At operation 206, normal playing is carried out.

In the present invention, when the <play> key is entered during a fast search, such as a 128× search, a backward search is executed. If the <play> key is entered once again, normal playing continues.

The signal processor 101 processes a signal read from the optical disc 100 as a reproduced signal. The memory 102 stores a program to drive the optical disc 100 and a program to search for a desired scene by entering twice the <play> key. The timer 103 counts the time from when the play key is first entered and transmits a signal to the controller 105 indicative of whether the <play> key is entered a second time within the predetermined time.

The controller 105, which controls the optical disc 100, the signal processor 101, the memory 102, the timer 103, and the displayer 104, ends the backward search in response to the signal input from the timer 103 and outputs to each block a signal to command the execution of normal playing at a point in time when the backward search has ended. The displayer 104 displays signals to reproduce the optical disc 100 including FLT.

In one embodiment, at operation 200, a user, while playing contents of the optical disc 100, executes a fast search function to search for the desired scene. When the fast search function is executed, the optical disc 100 may be operated at, for instance, 128×. To perform operation 200, the user may enter a key (not shown) outside the optical recording medium playing apparatus or a fast search key included in a remote controller (not shown).

When the fast search function is executed, the user watches a scene displayed on the displayer 104 and enters the <play> key at a desired scene, and, at operation 201, the controller 105 determines whether the <play> key is entered.

At operation 202, the controller 105 determines whether the optical disc 100 is being played at the fast search speed (e.g., 128×) at a point in time when the <play> key is entered.

At operation 203, if the optical disc 100 is being played at the fast search speed, the controller 105 operates the timer 103. Here, for illustrative purposes, the timer 103 is an FLT timer, which counts the playing time of the optical disc 100. The user can set the time counted by the timer 103 to, for instance, 2 minutes, 3 minutes, or the like. For illustrative purposes, in the present invention, the counted time is set to 2 minutes. The timer 103 counts down the amount of time set by the user.

At operation 204, when the timer 103 operates, the controller 105 outputs a control signal to perform the backward search of the optical disc 100 to the signal processor 101, the memory 102, the timer 103, and the displayer 104, and the optical disc 100 is backward searched in response to the control signal. The user can set the speed factor of the backward search to, for instance, 4×, 8×, or the like. For illustrative purposes, in the present invention, a speed factor of the backward search is set to 4×. The optical disc 100 is backward searched at the speed factor set by the user.

At operation 205, the user re-enters the <play> key once again when the desired scene appears during the backward search at the set speed factor and the controller 105 checks whether the <play> key is re-entered at the desired scene.

If the controller 105 determines that the <play> key has been re-entered, at operation 206, the backward search is ended and the optical disc 100 is normally replayed from a point in time when the backward search has ended.

At operation 207, the controller 105 checks a time counted by the timer 103 to determine whether the set 2 minutes have passed and if the user did not re-enter the <play> key. If the time counted by the timer 103 does not exceed 2 minutes, the backward search continues. If the time counted by the timer 103 exceeds 2 minutes, the backward search is ended. The optical disc 100 is normally replayed from the point in time when the backward search has ended.

Typically, most users input the <play> key when the desired scene appears during the fast 128× search and re-enter the <play> key after carrying out a backward 4× search to more accurately search for the desired scene. Under these circumstances, however, a number of times the key needs to be entered to search for the desired scene during the 128× is 5 in a following order <fast search>=><play>=><-2 speed factor backward search>=><-4 speed factor backward search>=><play>. However, in the present invention, the number of times the key needs to be entered is less, such as 3 in the order of <fast search>=><play>=><play>.

As described above, according to the present invention, a desired scene among scenes being played can easily be searched for by simple key manipulation during a backward search. The present invention makes it easier for a user to search for a scene.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of playing an optical recording medium, comprising:
   entering a play key when a desired scene appears during a fast search;
   executing a backward search at a predetermined speed factor when the play key is entered; and
   re-entering the play key when the desired scene appears during the backward search to execute normal playing.

2. The method of claim 1, wherein after the play key is entered, a timer to end the backward search begins to operate.

3. The method of claim 1, wherein if the play key is not re-entered, normal playing is executed from a point in time when the backward search has ended after the timer has operated for a predetermined amount of time.

4. The method of claim 3, wherein the predetermined amount of time is set by the timer and is based on the time required to play the optical recording medium.

5. A method of an optical recording medium apparatus playing an optical recording medium, comprising:
   executing a backward search of the optical recording medium when a <play> key is entered during a fast search;
   ending the backward search when the <play> key is re-entered; and
   continuing normal playing of the optical recording medium from a point in time when the backward search has ended.

6. The method as recited in claim 5, wherein the backward search of the optical recording medium is executed at a predetermined speed factor comprising one of 4× and 8×.

7. The method as recited in claim 5, further comprising:
   storing a program to drive the optical recording medium and a program to search for a desired scene when the <play> key is re-entered.

8. The method of claim 5, further comprising ending the backward search when a preset time expires if the <play> key is not re-entered.

9. A method of playing an optical recording medium, comprising:
   entering a key while playing contents of the optical recording medium to execute a backward search function to search for a desired scene;
   performing the backward search of the optical recording medium at a predetermined speed factor;
   counting a preset time from when the key is entered;
   re-entering the key when the desired scene appears during the backward search;
   ending the backward search when the key is re-entered or the preset play time has elapsed; and
   normally playing the optical disc from a point in time when the backward search has ended.

10. The method as recited in claim 9, wherein the backward search of the optical recording medium is executed at a predetermined speed factor comprising one of 4× and 8×.

11. The method as recited in claim 9, further comprising:
   storing a program to drive the optical recording medium and a program to search for a desired scene when the key is re-entered.

12. An optical recording medium playing apparatus to play an optical disc, comprising:
   a signal processor processing signals read from the optical disc as a reproduced signal;
   a timer counting a preset time from when the <play> key is entered a first time and transmitting a signal indicative of whether the <play> key is entered a second time within the preset time;
   a controller executing a backward search of a desired scene when the <play> key is entered the first time, ending the backward search when the <play> key is re-entered or in response to the signal from the timer, and outputting a signal to command normal playing at a point in time when the backward search has ended; and
   displayer displaying the signals read from the optical disc.

13. The optical recording medium playing apparatus as recited in claim 12, wherein the controller ends the backward search when the signal from the timer indicates that the <play> key is not entered the second time within the preset time.

14. The optical recording medium playing apparatus as recited in claim 12, further comprising:
   a memory storing a program to drive the optical disc and a program to search for the desired scene when re-entering the <play> key.

15. The optical recording medium playing apparatus as recited in claim 12, wherein the <play> key is outside the optical recording medium playing apparatus or a fast search key in a remote controller.

* * * * *

UNITED STATES PATENT AND TRADEMARK OFFICE
CERTIFICATE OF CORRECTION

PATENT NO.         : 7,330,639 B2                                          Page 1 of 1
APPLICATION NO. : 10/273097
DATED              : February 12, 2008
INVENTOR(S)        : Nam-hoon Jo It is certified that error appears in the above-identified patent and that said Letters Patent is hereby corrected as shown below:

On the title page item (74), (Attorney Agent or Firm), Line 1, change "Stass" to --Staas--.

Column 6, Line 20, before "displayer" insert --a--.

Signed and Sealed this

Twenty-second Day of July, 2008

JON W. DUDAS
*Director of the United States Patent and Trademark Office*